US012652235B2

(12) United States Patent
Liu

(10) Patent No.: US 12,652,235 B2
(45) Date of Patent: Jun. 9, 2026

(54) MLAG LINK FAILURE SWITCHING METHOD AND APPARATUS

(71) Applicant: HUAWEI TECHNOLOGIES CO., LTD., Shenzhen (CN)

(72) Inventor: Shuming Liu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 518 days.

(21) Appl. No.: 18/298,958

(22) Filed: Apr. 11, 2023

(65) Prior Publication Data

US 2023/0246949 A1 Aug. 3, 2023

Related U.S. Application Data

(63) Continuation of application No. PCT/CN2021/105665, filed on Jul. 12, 2021.

(30) Foreign Application Priority Data

Oct. 12, 2020 (CN) .......................... 202011086369.0

(51) Int. Cl.
*H04L 45/24* (2022.01)
*H04L 45/44* (2022.01)
(52) U.S. Cl.
CPC ............. *H04L 45/245* (2013.01); *H04L 45/44* (2013.01)
(58) Field of Classification Search
None
See application file for complete search history.

(56) References Cited

U.S. PATENT DOCUMENTS

| | | | |
|---|---|---|---|
| 8,787,149 | B1 | 7/2014 | Ramanathan et al. |
| 2003/0169734 | A1* | 9/2003 | Lu ........................... H04L 45/02 |
| | | | 370/386 |
| 2014/0204760 | A1 | 7/2014 | Durrani et al. |
| 2014/0241147 | A1 | 8/2014 | Rajagopalan et al. |
| 2016/0036728 | A1 | 2/2016 | Duda |
| 2020/0374230 | A1* | 11/2020 | Aibester ............... H04L 45/745 |

FOREIGN PATENT DOCUMENTS

| | | |
|---|---|---|
| CN | 106656789 A | 5/2017 |
| CN | 108390821 A | 8/2018 |
| CN | 109088819 A | 12/2018 |
| JP | 2014155186 A | 8/2014 |
| JP | 2015201751 A | 11/2015 |
| JP | 2017183873 A | 10/2017 |

* cited by examiner

*Primary Examiner* — Angela Nguyen
(74) *Attorney, Agent, or Firm* — Leydig, Voit & Mayer, Ltd.

(57) ABSTRACT

This application discloses an MLAG link failure switching apparatus and method. The apparatus includes a chip. The chip is configured to: generate a forwarding database, and forward a packet based on the forwarding database, where the forwarding database includes a first forwarding database, a second forwarding database, and a third forwarding database. The apparatus switches a faulty MLAG link by modifying a value of an active-standby switching flag corresponding to the faulty link in the first forwarding database, thereby reducing a link switching time and improving link switching efficiency.

20 Claims, 9 Drawing Sheets

| VLAN ID | MAC | Port |
|---------|-----|------|
| 100 | MAC-S | port1 |
| 100 | MAC3 | port7 |
| 100 | MAC1 | m-interface1 |
| 200 | MAC2 | m-interface2 |
| ... | ... | ... |

701
| IP | VLAN ID | MAC | Port |
|-----|---------|------|-------------|
| 1.1.1.2 | 100 | MAC1 | m-interface1 |
| 2.1.1.2 | 200 | MAC2 | m-interface2 |
| ... | ... | ... | ... |
702
FIG. 7
801
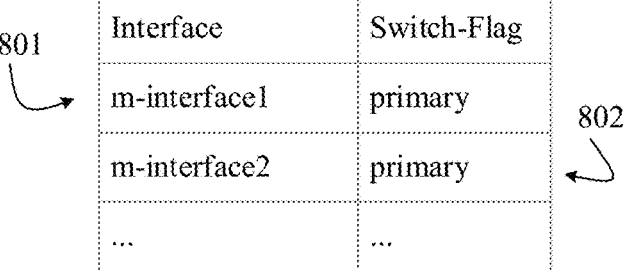
| Interface | Switch-Flag |
|--------------|-------------|
| m-interface1 | primary |
| m-interface2 | primary |
| ... | ... |
802
FIG. 8
901
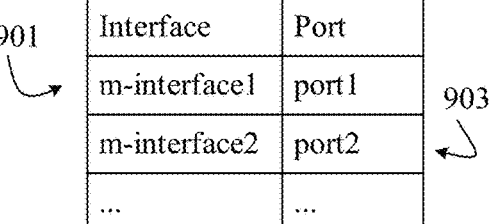
| Interface | Port |
|--------------|-------|
| m-interface1 | port1 |
| m-interface2 | port2 |
| ... | ... |
903
FIG. 9

MLAG LINK FAILURE SWITCHING METHOD AND APPARATUS

CROSS-REFERENCE TO RELATED APPLICATIONS

This application is a continuation of International Application No. PCT/CN2021/105665, filed on Jul. 12, 2021, which claims priority to Chinese Patent Application No. 202011086369.0, filed on Oct. 12, 2020. The disclosures of the aforementioned applications are hereby incorporated by reference in their entireties.

TECHNICAL FIELD

This application relates to communication technologies, and in particular, to an MLAG link failure switching method and apparatus.

BACKGROUND

A multi-chassis link aggregation group (MLAG) refers to aggregation of two or more switches across device links into an active-active system to improve link reliability.

Refer to FIG. 1. A switch 1 is connected to a port 3 of a switch 2 through a port 1 of the switch 1 (a link between the port 1 and the port 3 is referred to as a peer-link), to form an MLAG system. A server is connected to the MLAG system. That is, the server is connected to both the switch 1 and the switch 2 through two independent physical ports. The server can send packets to the two switches simultaneously based on an active-active configuration, or send a packet to only one switch based on an active-standby configuration (if the switch is faulty, the server sends the packet to the other switch). In a normal case, the switch 1 receives a packet from a network side, searches a local forwarding database (FDB) according to a destination address of the packet, for example, a MAC address table, to find a corresponding physical egress port connected to the server, for example, a port 2, and forwards the packet to the server through the port 2.

When a link (the port 2) between the server and the switch 1 is faulty, in a method, the switch 1 updates the forwarding database, and updates egress port values of all entries corresponding to the port 2 to the port 1 (the peer-link). In another method, the switch 1 deletes all entries corresponding to the port 2 or deletes all entries of the forwarding database, learns, through MAC address re-learning, a record of a mapping from a MAC address corresponding to the server to the port 1, and completes MLAG link switching.

Both of the two methods have disadvantages. In the former method, port values in the forwarding database need to be refreshed by using a CPU of the switch 1. During processing by the CPU, the forwarding database needs to be frozen. As a result, the forwarding database cannot be used for packet forwarding, and traffic on the switch 1 is interrupted for a period of time. In the latter method, in a re-learning process, the switch 1 broadcasts a packet within a specific period of time. In addition, it also takes a specific period of time to complete re-learning. In both of the two methods, it takes a relatively long time to complete MLAG link switching of the switch 1.

SUMMARY

This application provides an MLAG link failure switching method and apparatus to reduce time overheads required for link switching and improve link failure switching efficiency.

According to a first aspect, this application provides a network device for MLAG link failure switching. The network device includes a chip. The chip is configured to: generate a forwarding database, and forward a received packet based on the forwarding database. The forwarding database includes a first forwarding database, a second forwarding database, and a third forwarding database. The forwarding database is divided into three parts, so that a quantity of entries modified in the forwarding database when a link fails can be reduced, the time overheads can be reduced, and the link switching efficiency can be improved.

In an optional implementation, the first forwarding database is used to store a mapping from at least one multi-chassis link aggregation group (MLAG) member interface to at least one active-standby switching flag; the second forwarding database is used to store a mapping from at least one first physical port to the at least one MLAG member interface; and the third forwarding database is used to store a mapping from a media access control MAC address to a first MLAG member interface, where the first MLAG member interface is in the at least one MLAG member interface. The network device decouples an association between a MAC address and a physical port by using an MLAG member interface, so that when a network link changes (for example, a link is faulty), the network device can implement switching of the faulty link without modifying information about the MAC address and the physical port, thereby improving the switching efficiency.

In an optional implementation, the chip is further configured to store a mapping from a source MAC address of the packet to a second MLAG member interface in the third forwarding database, where the second MLAG member interface is an MLAG member interface corresponding to a first physical port based on the second forwarding database, and the first physical port is a physical port receiving the packet.

In an optional implementation, when an MLAG link is faulty, the chip updates a value of an active-standby switching flag corresponding to a third MLAG member interface in the first forwarding database to a backup flag, where the backup flag is used to instruct the chip to send a packet pointing to the third MLAG member interface through a peer-link, the third MLAG member interface is an MLAG member interface corresponding to a second physical port based on the second forwarding database, and the second physical port is a physical port of the MLAG link. The network device completes switching of the faulty link only by modifying the value of the active-standby switching flag, thereby improving the link switching efficiency.

In an optional implementation, when the MLAG link is recovered, the chip updates the value of the active-standby switching flag corresponding to the third MLAG member interface to a primary flag, where the primary flag is used to instruct the chip to forward the packet based on the second forwarding database. The network device completes recovery of the faulty link only by modifying the value of the active-standby switching flag, thereby improving the link recovery efficiency.

In an optional implementation, the chip is configured to: determine, based on the third forwarding database, that the MLAG member interface corresponding to a destination MAC address of the packet is the first MLAG member interface; and when a value of an active-standby switching flag corresponding to the first MLAG member interface in the first forwarding database is the primary flag, forward the packet through a third physical port, where the third physical port is a physical port corresponding to the first MLAG member interface in the second forwarding database.

In an optional implementation, when the value of the active-standby switching flag corresponding to the first MLAG member interface is the backup flag, the chip forwards the packet through the peer-link.

In an optional implementation, the network device and another network device form an MLAG system, and the network device is configured to synchronize the third forwarding database to the another network device. The third forwarding database is synchronized in the MLAG systems, so that after a link fails, when a new external device is connected to the MLAG system, the network device can obtain information about the new access device.

According to a second aspect, this application discloses an MLAG link switching method. The method includes: when an MLAG link of a network device is faulty, updating a value of an active-standby switching flag corresponding to a first MLAG member interface in a first forwarding database to a backup flag, where the backup flag is used to instruct the network device to send a packet pointing to the first MLAG member interface through a peer-link, the first MLAG member interface is an MLAG member interface corresponding to a first physical port according to a second forwarding database, and the first physical port is a physical port of the MLAG link; and the network device includes the first forwarding database and the second forwarding database, where the first forwarding database is used to store a mapping from at least one multi-chassis link aggregation group (MLAG) member interface to at least one active-standby switching flag, and the second forwarding database is used to store a mapping from at least one physical port to the at least one MLAG member interface.

In an optional implementation, when the MLAG link is recovered, a value of the active-standby switching flag corresponding to the first MLAG member interface is updated to a primary flag, where the primary flag is used to instruct the network device to send the packet based on the second forwarding database.

In an optional implementation, the network device further includes a third forwarding database, and the method further includes: storing a mapping from a source MAC address of the packet to a second MLAG member interface in the third forwarding database, where the second MLAG member interface is an MLAG member interface corresponding to a second physical port based on the second forwarding database, and the second physical port is a physical port receiving the packet.

In an optional implementation, the method further includes: determining, based on the third forwarding database, that an MLAG member interface corresponding to a destination MAC address of the packet is the first MLAG member interface, where the third forwarding database further includes a mapping from the destination MAC address to the first MLAG member interface; and when the value of the active-standby switching flag corresponding to the first MLAG member interface in the first forwarding database is the primary flag, forwarding the packet by using the first physical port.

In an optional implementation, when the value of the active-standby switching flag corresponding to the first MLAG member interface is the backup flag, the packet is forwarded through the peer-link.

In an optional implementation, the third forwarding database is synchronized to another network device, where the another network device and the network device form an MLAG system.

For beneficial effects of the second aspect of this application, refer to the first aspect and the implementations of the first aspect.

BRIEF DESCRIPTION OF DRAWINGS

FIG. 7 is a diagram of a third forwarding database L3FDB according to an embodiment of this application;

FIG. 8 is a diagram of a first forwarding database according to an embodiment of this application;

FIG. 9 is a diagram of a second forwarding database according to an embodiment of this application;

DESCRIPTION OF EMBODIMENTS

To make a person skilled in the art understand the solutions in this application better, the following clearly describes technical solutions in embodiments of this application with reference to accompanying drawings in embodiments of this application.

A plurality of switches use a multi-chassis link aggregation group (MLAG) mechanism to implement link aggregation between a plurality of devices. These devices form an active-active system, which is also known as an MLAG system. A server or a customer edge (CE) is connected to a network such as a common Ethernet network, a transparent interconnection of lots of links (TRILL) network, a virtual extensible local area network (VXLAN), or the Internet through the MLAG system. Through connection to the MLAG system, load balancing and backup protection can be implemented.

Figure 2:
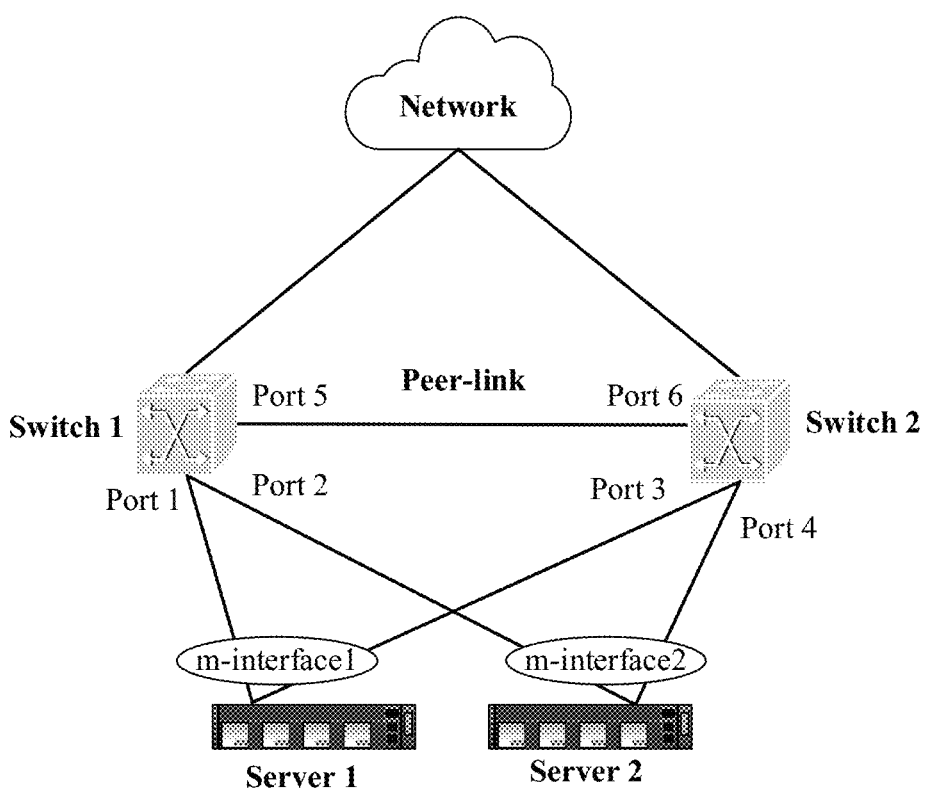
FIG. 2 is a diagram of an MLAG networking mode.
Figure 3:
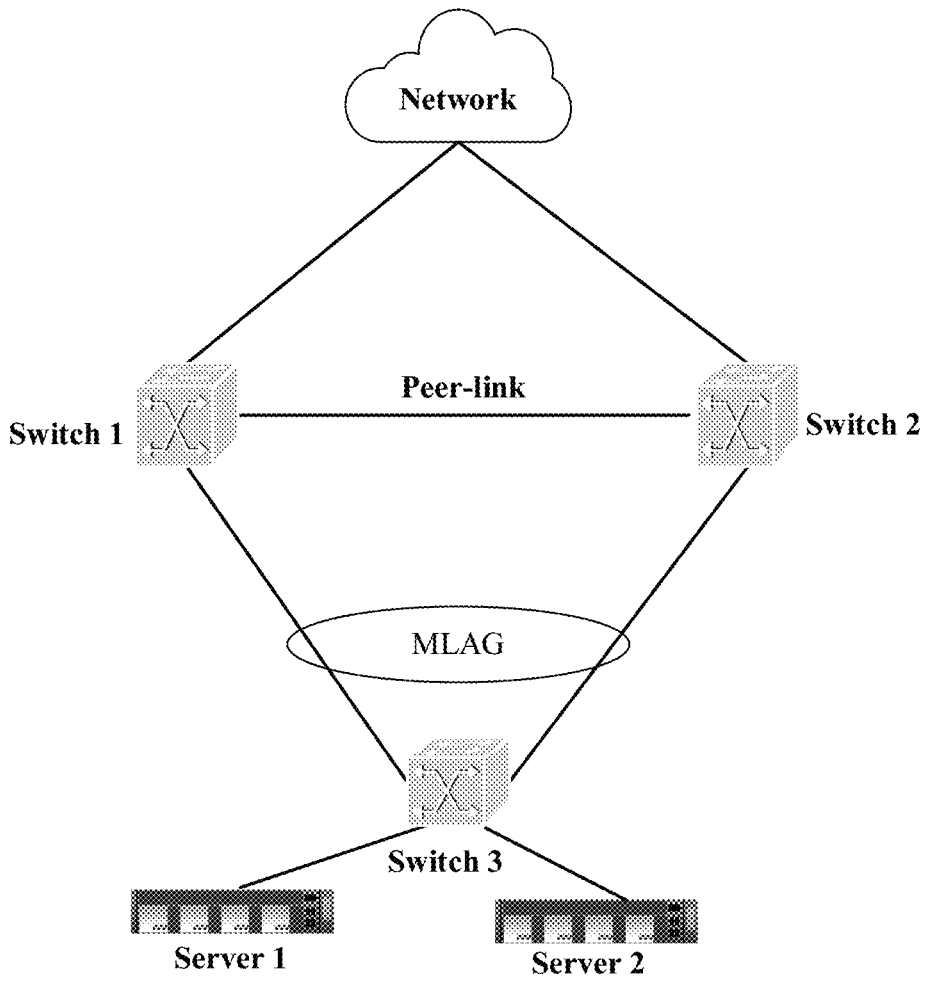
FIG. 3 is a diagram of another MLAG networking mode.
Figure 4:
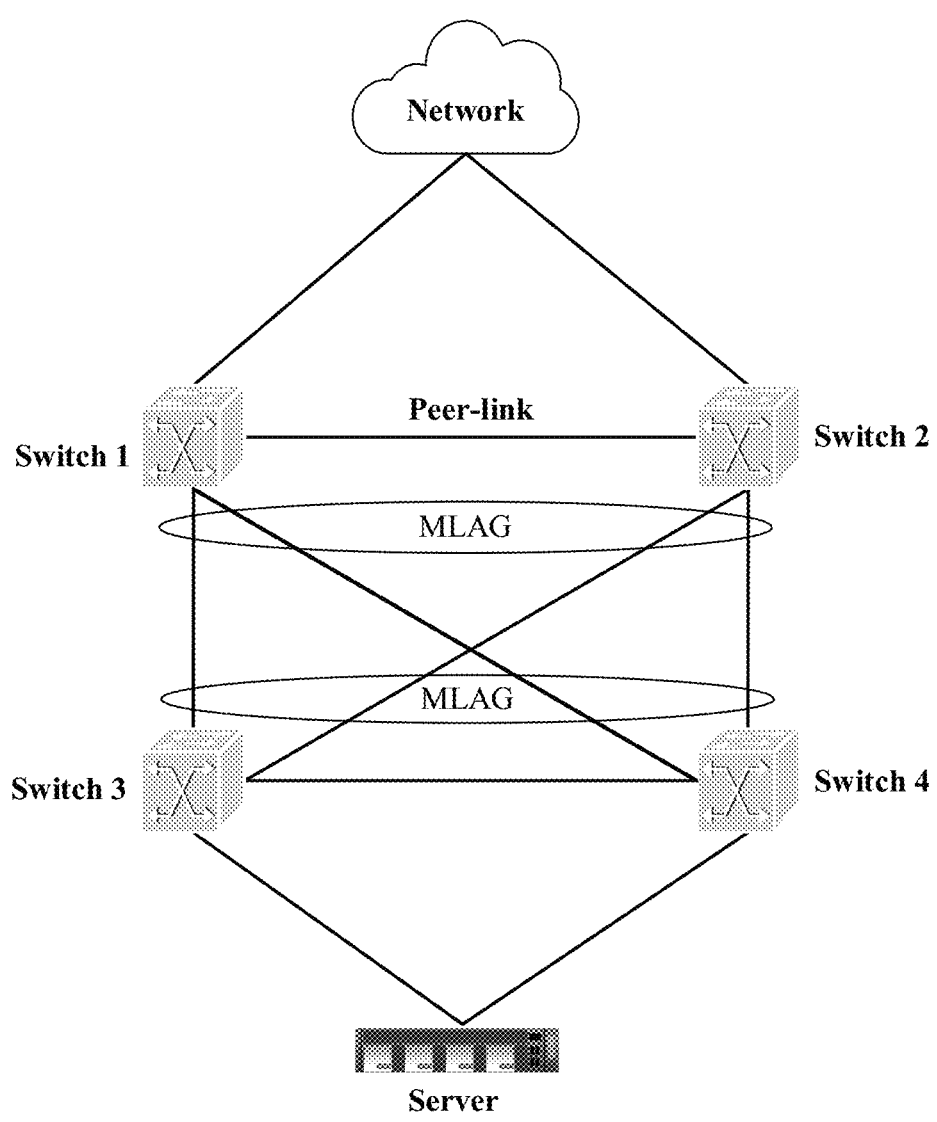
FIG. 4 is a diagram of another MLAG networking mode.

There are a plurality of networking modes of the MLAG system, such as server connection, switch connection, and a multi-level MLAG mode. The server connection is shown in FIG. 2. Servers are connected to the network through a switch 1 and a switch 2 (the switch 1 and the switch 2 form an MLAG system). The switch connection is shown in FIG. 3. A customer edge (a switch 3) is connected to a switch 1 and a switch 2 (the switch 1 and the switch 2 form an MLAG system), and servers are connected to a network by using the switch 3. As shown in FIG. 4, a switch 1 and a switch 2 form an MLAG system (assuming that the MLAG system is mlag1), a switch 3 and a switch 4 form an MLAG system (assuming that the MLAG system is mlag2), and the switch 3 and the switch 4 are connected to the mlag1 system. There may be more networking modes of the MLAG system. This is not limited in this application. An MLAG link switching apparatus disclosed in this application may be any switch in the MLAG system shown above, for example, the switch 1 or the switch 2 shown in FIG. 2 or FIG. 3, and the switch 1, the switch 2, the switch 3, or the switch 4 shown in FIG. 4. For ease of description, in this application, the switch 1 in the server connection scenario shown in FIG. 2 is used as an example to describe the MLAG link switching apparatus.

Figure 1:
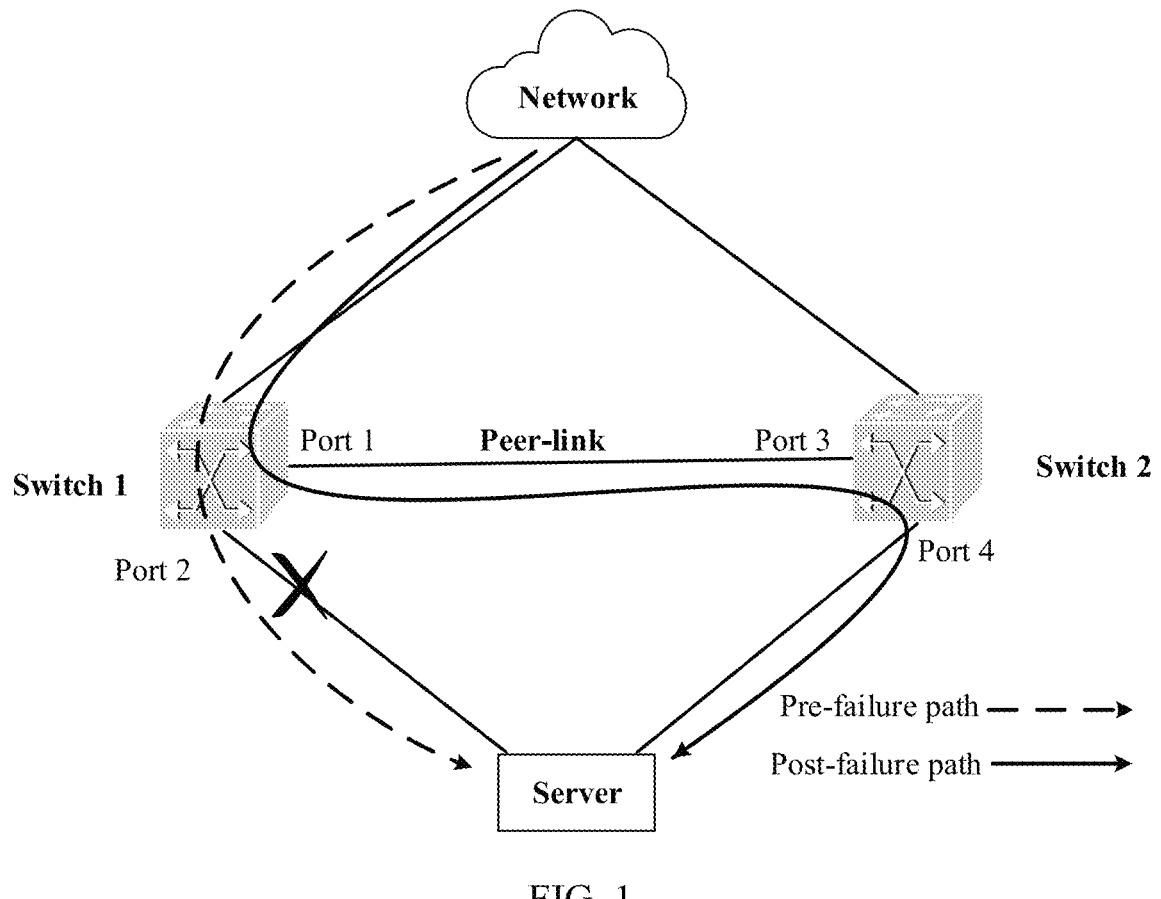
FIG. 1 is a diagram of a multi-chassis link aggregation group (MLAG)
Figures 5, 6:
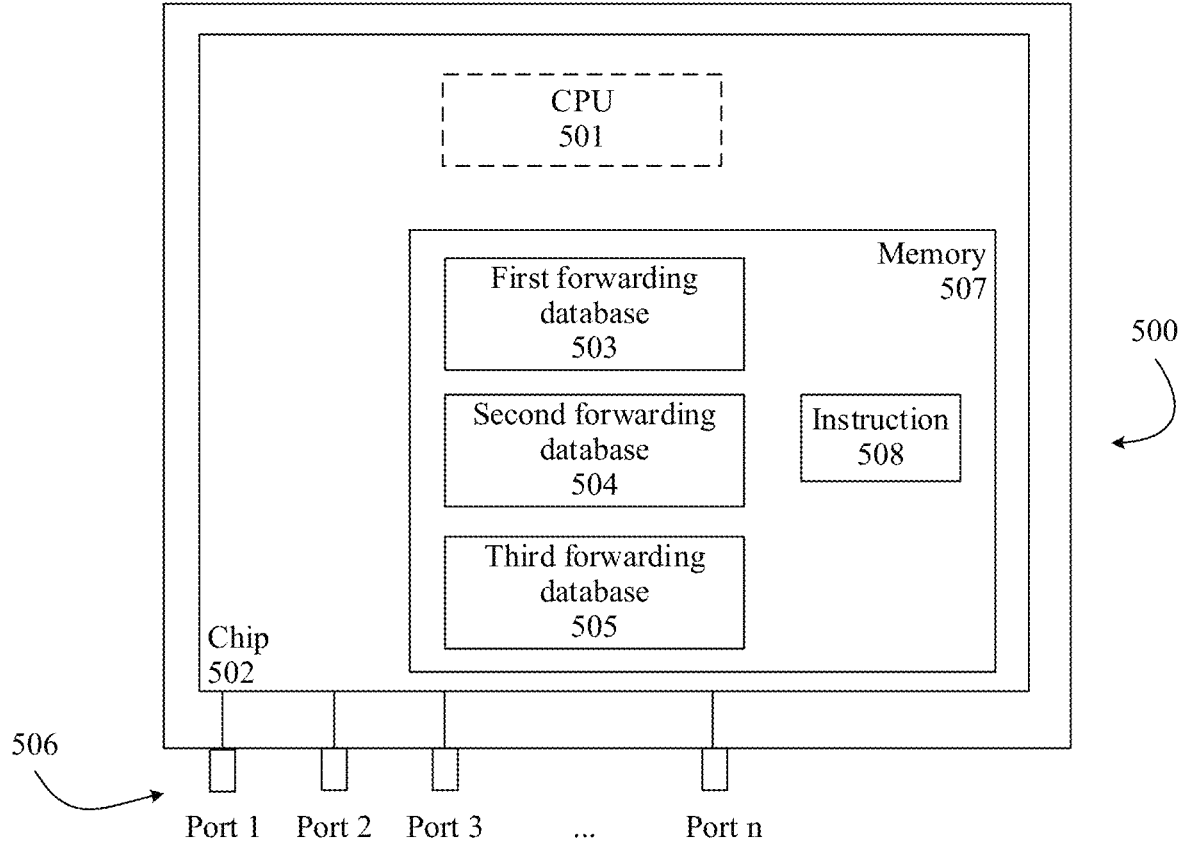
FIG. 5 is a diagram of an MLAG link failure switching apparatus according to an embodiment of this application.
FIG. 6 is a diagram of a third forwarding database (i.e., a layer 2 forwarding database) L2FDB according to an embodiment of this application.

The MLAG link switching apparatus is shown by a switch 500 in FIG. 5. The switch 500 includes a chip 502, a memory 507, and a port 506. The port 506 is used to forward a packet. In addition, the port 506 may be connected to an external device to form an MLAG link or a peer-link. As shown in FIG. 1, for the switch 1, each of the port 1 and the port 2 comprises the port 506. The chip 502 may be an application-specific integrated circuit (ASIC), a field programmable gate array (FPGA), a network processor (NP), or the like. The memory 507 may be a volatile memory such as a random access memory (RAM), a dynamic random access memory DRAM), a static random access memory (SRAM), a content addressable memory (CAM), a non-volatile memory such as a read-only memory (ROM) or a solid state disk (SSD), or may be a combination of a plurality of types of memories. During actual deployment, the memory 507 may include a plurality of memories of different types or a same type, and the plurality of memories may be deployed in different modules of the switch 500. For example, as shown in FIG. 5, the memory 507 may be located in the chip 502, but the memory 507 may also be located outside the chip 502. The memory 507 may store an instruction 508 or store entries of the first forwarding database 503, the second forwarding database 504, and the third forwarding database 505. The instruction 508 and the entries of the first forwarding database 503, the second forwarding database 504, and the third forwarding database 505 may be stored in one memory, or may be separately stored in different memories. This is not limited in this application.

The chip 502 may further include a central processing unit (CPU) 501. The CPU 501 may be configured to control forwarding and maintain some software entries (such as a software routing table and a software ARP (address resolution protocol) table). In addition, the chip 502 may support routing and forwarding by searching a software routing table or a software APR table by using the CPU 501. The switch 500 generates the first forwarding database 503, the second forwarding database 504, and the third forwarding database 505 by invoking the instruction 508 by using the CPU 501 or the chip 502.

As shown in FIG. 8, the first forwarding database 503 includes a mapping from an MLAG member interface to an active-standby switching flag (switch-flag). The MLAG member interface is indicated by a logical identifier of a physical port (also referred to as an MLAG port) that connects the switch 1 to an external device, and is used to indicate a specific external device connected to the switch 1. A link (including physical ports at two ends of the link) that is connected to the external device (the external device may be a server or a switch, for example, the server 1 in FIG. 2 or the switch 3 in FIG. 3) by using the MLAG port is referred to as an MLAG link. The MLAG link is also a primary link for communication between the external device and the switch 1. As shown in FIG. 2, for the switch 1, "m-interface1" indicates that the switch 1 is connected to the server 1 through a port 1, and "m-interface2" indicates that the switch 1 is connected to the server 2 through a port 2. A primary link for communication between the server 1 and the switch 1 is an MLAG link connected by using port 1, and a backup link is the peer-link that is connected by the switch 1 to the switch 2 through the port 5. A primary link for communication between the server 2 and the switch 2 is an MLAG link connected through the port 2, and a backup link is a peer-link connected to the switch 2 through the port 5. For the switch 2, "m-interface1" indicates that the switch 2 is connected to the server 1 through the port 3, and "m-interface2" indicates that the switch 2 is connected to the server 2 through the port 4. A primary link for communication between the server 1 and the switch 2 is an MLAG link connected through the port 3, and a backup link is a peer-link that is connected by the switch 2 to the switch 1 through the port 6. A primary link for communication between the server 2 and the switch 2 is an MLAG link connected through the port 4, and a backup link is a peer-link that is connected by the switch 2 to the switch 1 through the port 6. The active-standby switching flag is used to indicate a current status of an MLAG link. As shown in FIG. 8, an entry 801 indicates that an MLAG link (the port 1) between the switch 1 and the server 1 in FIG. 2 is normal, and the switch 1 forwards a packet to the server 1 through the port 1. When the MLAG link (the port 1) is faulty, a value of the active-standby switching flag of the entry 801 is switched from "primary" to "backup", indicating that the switch 1 needs to switch an egress port originally used to send a packet to the server 1 from the port 1 to the port 5. In this application, a character string such as "m-interface1\2" is used to identify an MLAG member interface. During actual deployment, the MLAG member interface may be identified by using an identifier including any character. For example, the active-standby switching flag may also be identified by "active/standby" in addition to "primary/backup". This is not limited in this application.

The second forwarding database 504 includes a mapping from an MLAG member interface to a physical port connected to an external device. As shown in FIG. 9, FIG. 9 shows mappings between MLAG member interfaces of the switch 1 in FIG. 2 and physical ports that are used by the switch 1 to connect to the server 1 and the server 2. An entry 901 indicates that the switch 1 is connected to the server 1 through the port 1, and an entry 902 indicates that the switch 1 is connected to the server 2 through the port 2.

The third forwarding database 505 includes a layer 2 forwarding database (L2FDB). The L2FDB is mainly used for packet forwarding at a data link layer (layer 2). When the switch 500 has a layer 3 switching function, the third forwarding database 505 further includes a layer 3 forwarding database (L3FDB). The L3FDB is used for packet forwarding at a network layer (layer 3). The L2FDB includes information such as a MAC address and a port mapping, and the port information may be a physical port or an MLAG member interface. In addition to the MAC address and the port information, the L2FDB may further include a virtual local area network (VLAN) identifier (VID). The L2FDB is shown in FIG. 6. As shown in FIG. 7, the L3FDB includes an IP address, a VID, a MAC address, and port information. In an implementation, the L3FDB does not include port information. In a packet forwarding process, the switch 500 needs to search the L2FDB for the port information according to the VID and the MAC address.

Figure 10:
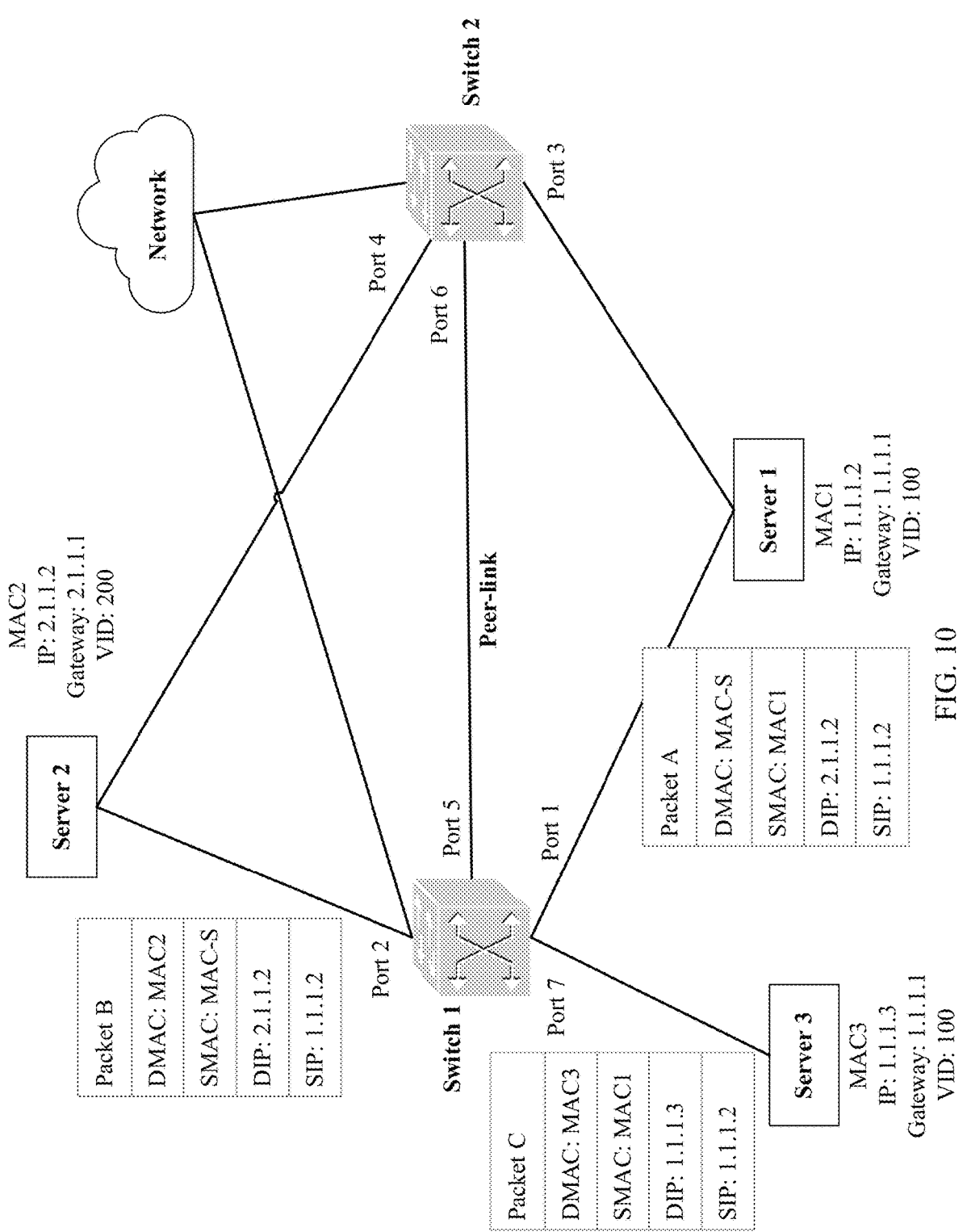
FIG. 10 is a diagram of generating entries of a third forwarding database according to an embodiment of this application.

Content of the first forwarding database 503 and the second forwarding database 504 may be generated when the switch 500 receives a packet for forwarding, but is usually generated when a network administrator configures an MLAG. As shown in FIG. 2, when the switch 1 and a switch 2 are configured to form an MLAG system, and the server 1 is connected to the MLAG system, the switch 1 may automatically generate (through link discovery or the like) or manually generate information about related entries of the first forwarding database 503 shown in FIG. 8 and the second forwarding database 504 shown in FIG. 9. The entries of the third forwarding database 505 may be generated through manual configuration or dynamic learning (MAC learning). In this application, dynamic learning is used as an example, and FIG. 2 is extended to describe a process of creating entries of the first forwarding database 503. As shown in FIG. 10, configurations of the switch 1, the switch 2, the server 1, the server 2, and the server 3 are as follows:

| Device name | IP | MAC | Gateway | VLAN |
|---|---|---|---|---|
| Switch 1 | IP-S | MAC-S | | |
| Switch 2 | IP-S | MAC-S | | |
| Server 1 | 1.1.1.2 | MAC1 | 1.1.1.1 | VLAN 100 |
| Server 2 | 2.1.1.2 | MAC2 | 2.1.1.1 | VLAN 200 |
| Server 3 | 1.1.1.3 | MAC3 | 1.1.1.1 | VLAN 100 |

Because the switch 1 and the switch 2 form an MLAG system, the switch 1 and the switch 2 are set to have a same IP address and a same MAC address (in an implementation, MAC addresses in the MLAG system may be different). Because both the switch 1 and the switch 2 are connected to a VLAN 100 and a VLAN 200, an interface IP address of the VLAN 100 (also known as a layer 3 interface IP address) is set to 1.1.1.1, and an interface IP address of the VLAN 200 is set to 2.1.1.1. The MAC address (MAC-S) of the switch 1 may be a physical address of the switch 1, or may be a virtual address, and the MAC address is used for layer 3 packet switching. The server 1 and the server 3 belong to the same VLAN (the VLAN 100), and a default gateway is 1.1.1.1. The switch 2 belongs to another VLAN (the VLAN 200), and a default gateway is 2.1.1.1.

When the server 1 (a physical host or a virtual machine) communicates with the server 2, assuming that a packet is sent from the server 1 to the server 2, a process is as follows (assuming that an L2FDB of a third forwarding database of the switch 1 includes a VLAN ID, and an L3FDB includes port information):

1. The server 1 determines that a destination IP address 2.1.1.1 (the server 2) is not in the same VLAN as the server 1. Therefore, the server 1 sends an ARP request for requesting a MAC address corresponding to the gateway 1.1.1.1.
 2. After receiving the ARP request from the server 1, a chip of the switch 1 finds that the requested IP address is a layer 3 interface IP address of the switch 1, and therefore the switch 1 sends an ARP response including a MAC address (MAC-S) of the switch 1. In addition, because the switch 1 receives the ARP request packet through the port 1, the switch 1 may search the second forwarding database by using the identifier (portl) of the port 1, for example, to find a corresponding MLAG member interface identifier "m-interface1" by using the entry 901 shown in FIG. 9; and the switch 1 stores a correspondence (1.1.1.2<=>MAC1<=>100<=>m-interface1) between a source MAC address, a source IP address and a VLAN identifier to which the port 1 belongs in the ARP request packet and an MLAG member interface, into the L3FDB of the third forwarding database, as shown by an entry 701 in FIG. 7. In addition, the switch 1 further stores a correspondence (MAC1<=>100<=>m-interface1) between the source MAC address and the VLAN identifier in the ARP request packet and the MLAG member interface into the L2FDB, as shown by an entry 603 in FIG. 6. In this example, the source MAC address and the source IP address of the ARP request are those of the server 1. When the MLAG networking mode is the switch connection shown in FIG. 3, the source MAC address may also be a MAC address of the switch 3.

3. After receiving the APR response from the switch 1, the server 1 assembles a packet (packet A) and sends the packet to the switch 1. In the packet, a destination MAC address is MAC-S, a source MAC address is MAC1, a source IP address is 1.1.1.2, and a destination IP address is 2.1.1.2.
 4. After receiving the packet A, the chip of the switch 1 searches the L2FDB according to the destination MAC address and the VID of the packet A, and finds an entry that matches a MAC address of a layer 3 interface of the switch 1 (for example, an entry 601 shown in FIG. 6; the entry 601 is automatically added when the switch 1 configures the VLAN 100; a layer 3 forwarding flag of the entry 601 is set because the layer 3 forwarding flag is not identified in FIG. 6; and the set information is used to indicate that layer 3 forwarding needs to be performed when the destination address of the packet matches the entry); and then continues to search the L3FDB of the third forwarding database.
 5. The chip of the switch 1 searches the L3FDB according to the destination address (2.1.1.2) of the packet. Because no entry has been created, the chip of the switch 1 fails to search the L3FDB, and sends the packet to the CPU of the switch 1 for processing by software.
 6. The CPU of the switch 1 searches a software routing table of the switch 1 according to the destination IP address (2.1.1.2) of the packet, and finds that an interface IP address of the VLAN 200 is matched. Therefore, the CPU continues to search a software APR table of the switch 1, but the search still fails. Then the switch 1 sends an ARP request to all ports in the VLAN 200 to request a MAC address corresponding to 2.1.1.2.
 7. After receiving the ARP packet from the switch 1, the server 2 finds that the requested IP address is its own IP address. Therefore, the server 2 sends an ARP response including a MAC address (MAC2) of the server 2. In addition, the server 2 records the correspondence (2.1.1.1<==>MAC-S) between the IP address and the MAC address of the switch 1 in an ARP table of the server 2.
 8. After receiving the ARP response of the server 2, the switch 1 searches the second forwarding database based on a port (the port 2) used by the switch 1 to receive the packet, and finds a corresponding MLAG member interface identifier "m-interface2" according to the entry 903 in FIG. 9. The switch 1 records a correspondence (2.1.1.2<=>MAC1<=>200<=>m-interface2) between the source MAC address, the source IP address and the VLAN identifier in the ARP response packet, and an MLAG member interface into the third forwarding database L3FDB, as shown by an entry 702 in FIG. 7. In addition, the switch 1 stores a correspondence (MAC2<=>200<=>m-interface2) between the source MAC address and the VLAN identifier in the ARP response packet and the MLAG member interface into the L2FDB, for example, an entry 604 shown in FIG. 6. After confirming the destination MAC address (MAC2) corresponding to the destination IP address 2.1.1.2, the switch 1 sends a packet B to the server 2. A difference between the packet B and the packet A is that the destination MAC address of the packet A is MAC2 and the source MAC address of the packet A is MAC-S.

9. After receiving the packet B, the server 2 sends a response packet to the server 1. A forwarding process of the response packet is similar to the foregoing steps. The only difference is that because the L3FDB of the switch 1 already includes the information about related entries of the server 1, the response packet does not need to be processed by the CPU of the switch 1 again. Instead, the chip of the switch 1 determines, according to the MLAG member interface identifier "m-inter-face1" in the L3FDB (the entry 701 in FIG. 7) and the entry 801 that is in the first forwarding database and that is shown in FIG. 8, that the MLAG link is in a "primary" (normal) state, and the switch 1 needs to forward the packet through the MLAG link. Therefore, the chip of the switch 1 searches the second forwarding database, and sends the packet to the server 1 through the port 1 according to the entry 901 shown in FIG. 9.

Through the foregoing steps, the switch 1 completes learning of the entries of the third forwarding database. Subsequently, a packet between the server 1 and the server 2 may be forwarded by hardware by the chip of the switch 1 directly by searching the first forwarding database, the second forwarding database, and the third forwarding data-base, without a need to perform routing and forwarding by using the CPU of the switch, thereby improving packet forwarding efficiency.

When the switch 1 is a layer 2 switch and performs only layer 2 forwarding, a learning process of the entries of the third forwarding database is shown in FIG. 10.

1. A server 1 and a server 3 belong to a same VLAN (VLAN 100). Because an ARP table of the server 1 initially does not include MAC address information of the server 3, the server 1 broadcasts an ARP request for requesting the MAC address of the server 3, where a destination IP address of the ARP request is 1.1.1.3.

2. After receiving the ARP request of the server 1, the chip of the switch 1 finds a corresponding MLAG member interface identifier "m-interface1" in the second for-warding database according to the ingress port (the port 1) of the ARP request, and the switch 1 records a correspondence (100<=>MAC1<=>m-interface1) between the source MAC address and the VLAN identifier (VLAN 100) to which the port 1 belongs in the ARP request and an MLAG member interface identifier, into the L2FDB, as shown by an entry 603 in FIG. 6. The switch 1 identifies the destination MAC address of the packet as a broadcast address and broadcasts the packet in the VLAN 100.

3. After receiving the broadcast packet, the server 3 updates the information (the source MAC address and the source IP address) of the server 1 into an ARP table of the server 3. Because the destination IP address of the broadcast packet is the IP address of the server 3, the server 3 sends, to the server 1, an ARP response including a MAC address (MAC2) of the server 3.

4. After receiving the ARP response, the chip of the switch 1 searches the second forwarding database for a cor-responding MLAG member interface identifier accord-ing to an ingress port (the port 7) of the ARP response packet of the switch 1. Because the server 3 is con-nected only to the switch 1, and is not connected to the switch 2, the MLAG member interface identifier cor-responding to the port 7 cannot be found in the second forwarding database. Therefore, the chip of the switch 1 adds a correspondence (MAC3<=>VLAN 100<=>port7) between the source MAC address (here, the MAC address MAC3 of the server 3) and the VLAN identifier (VLAN 100) corresponding to the port 7 in the ARP response packet and the physical port (the port 7) to the L2FDB of the switch 1, as shown by an entry 602 in FIG. 6. In addition, the chip of the switch 1 searches the L2FDB according to the desti-nation MAC address (MAC1) and the VID (VLAN 100) of the ARP request packet, and finds a correspond-ing MLAG member interface identifier "m-interface1" by using the entry 603 shown in FIG. 6, searches the first forwarding database (the entry 801 shown in FIG. 8) and the second forwarding database (the entry 901 shown in FIG. 9), and determines that a physical port corresponding to "m-interface1" is the "port 1" and that a current status of the MLAG link is "primary". Finally, the switch 1 sends the ARP response to the server 1 through the port 2.

5. After receiving the ARP response, the server 1 adds the MAC address of the server 3 to an ARP table of the server 1. Then the server 1 can send a packet C whose destination MAC address is MAC3 to the serve 3.

6. After receiving the packet C, the chip of the switch 1 finds, according to the destination MAC address and the VID in the packet C, a port identifier "port7" corresponding to an entry (the entry 602 shown in FIG. 6) in the L2FDB. Because "port7" indicates a physical port, the switch 3 does not need to continue to search the first forwarding database and the second forwarding database, and directly sends the packet C to the server 3 through the port 7.

7. After receiving the packet C, the server 3 sends a response packet of the packet C.

8. After receiving the response packet of the packet C, a process is similar to step 4: The switch 1 searches the third forwarding database (the L2FDB), the first for-warding database, and the second forwarding database, and finally finds a physical egress port 1, and sends the packet to the server 1 through the port 1.

Through the foregoing steps, the switch 1 completes learning of the entries of the third forwarding database. Subsequently, for packet forwarding between the server 1 and the server 3, the switch 1 only needs to search the first forwarding database, the second forwarding database, and the third forwarding database by using the chip and then perform forwarding by hardware.

Figure 11:
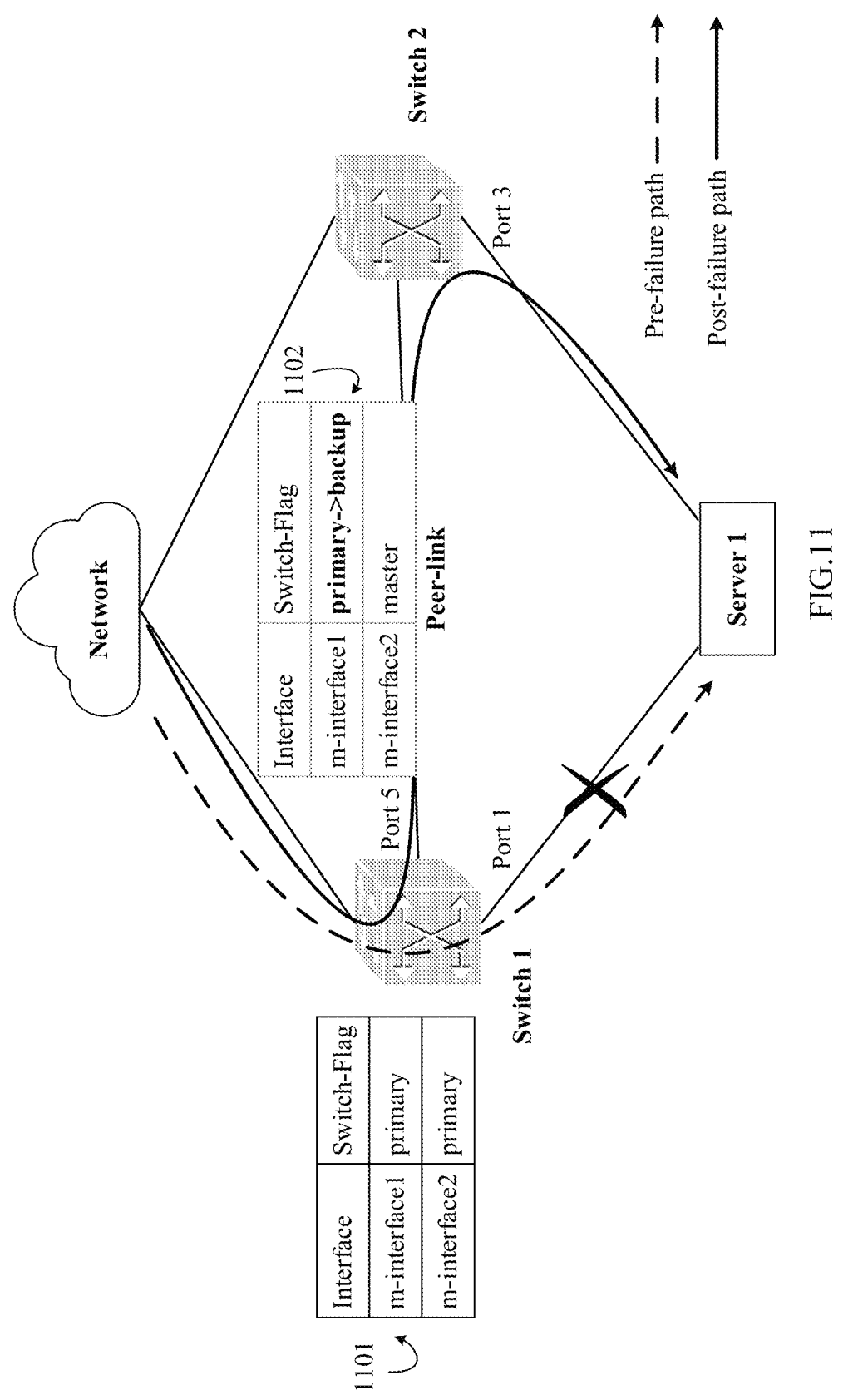
FIG. 11 is a diagram of MLAG link switching according to an embodiment of this application.

As shown in FIG. 11, a server 1 is connected to an MLAG system including a switch 1 and a switch 2. When a chip or the CPU of the switch 1 detects that an MLAG link (a port 1) is faulty, the chip of the switch 1 determines, by searching a second forwarding database, for example, an entry 901 shown in FIG. 9, that an MLAG member interface corre-sponding to the faulty MLAG link is "m-interface1". The chip searches the first forwarding database for a correspond-ing active-standby switching flag according to "m-inter-face1", for example, an entry 1101, and changes the active-standby switching flag from "primary" to "backup" (an entry 1102), so as to instruct the switch 1 to communicate with the server 1 through a peer-link (the port 5). When the MLAG link (the port 1) is recovered, the chip changes, based on the second forwarding database and the first forwarding data-base, an active-standby switching flag corresponding to the MLAG link from "backup" to "primary", to instruct the switch 1 to communicate with the server 1 by using the MLAG link (port 1). When the MLAG link is faulty or recovered, the switch 1 only needs to modify the corre-sponding active-standby switching flag in the first forwarding database according to the event, to implement link switching. When link failure switching is performed by using the foregoing method, compared with a manner of updating a plurality of entries in a MAC address table (one faulty port corresponds to a plurality of MAC addresses) or deleting a mapping record of the faulty port and then re-learning (learning a MAC address, which requires processes such as packet broadcast and packet response), the link failure switching method disclosed in this application consumes less time, and can greatly improve the link switching efficiency.

Figure 12:
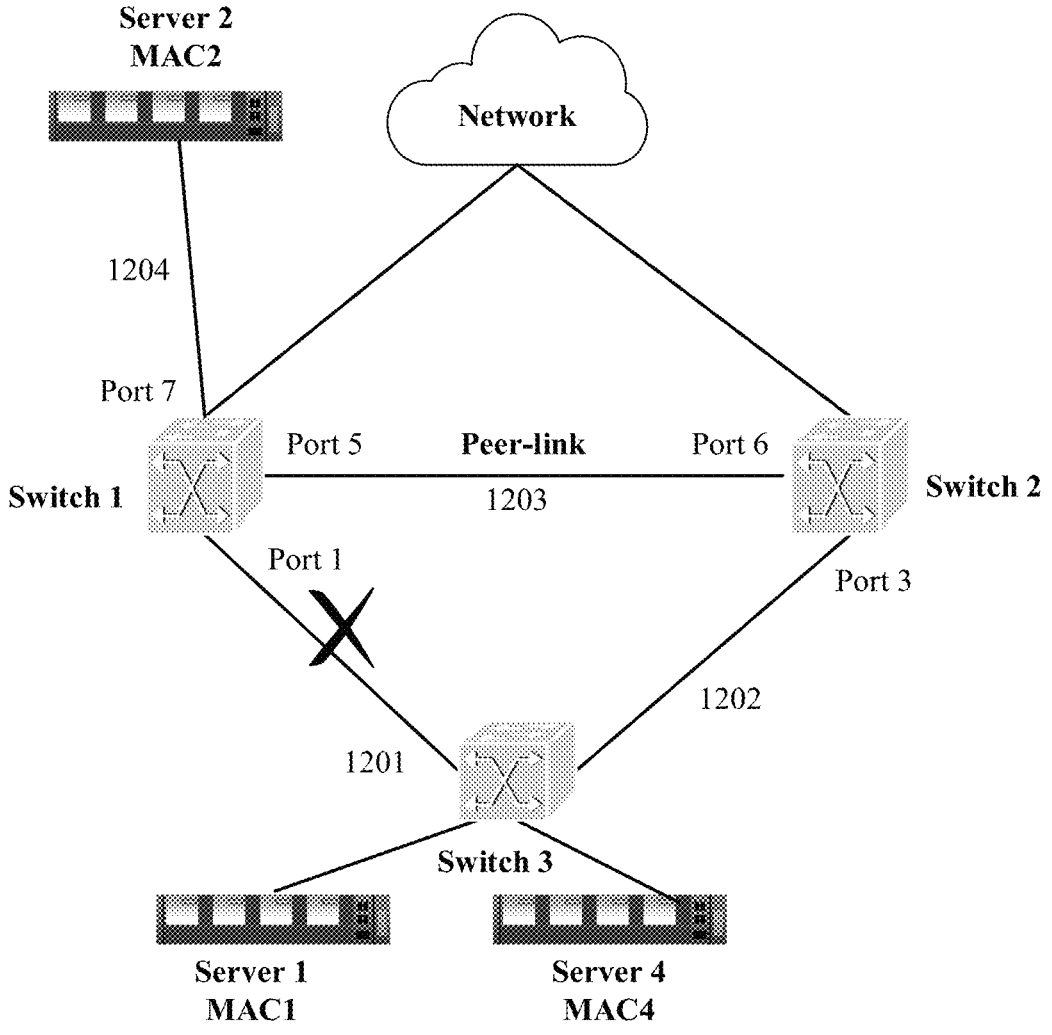
FIG. 12 is a diagram of a newly added access device according to an embodiment of this application.

As shown in FIG. 12, a switch 3 is connected to an MLAG system formed by a switch 1 and a switch 2, and a server 1 communicates, by using the switch 3, with a server 2 connected to the switch 1. In a normal case, the server 1 communicates with the server 2 through the switch 3, the link 1201, the switch 1, and a link 1204. When the link 1201 is faulty, the switch 1 switches the MLAG link (the link 1201) to the peer-link (a link 1203). Because a third forwarding database of the switch 1 stores information about the server 1 and the server 2, the server 1 and the server 2 may continue to communicate with each other. In this case, a new server 4 is connected to the switch 3. For the switch 2, an MLAG link (a link 1202) corresponding to the switch 3 is normal, and MAC information of the server 4 can be normally learned and filled in a third forwarding database of the switch 2. However, for the switch 1, because a packet sent by the server 4 is received through a peer-link (a link 1203), and the packet does not carry information about the switch 3, it cannot be determined that the MLAG link corresponding to the server 4 is the link 1201, and MAC information (the MLAG member interface identifier cannot be determined) of the server 4 cannot be filled in the third forwarding database of the switch 1. In an implementation, before the switch 1 receives the packet sent by the server 4, the switch 2 synchronizes, to the switch 1 through a peer-link, information about the third forwarding database (including information about the server 4) that is stored in switch 2. The switch 1 synchronizes the information about the server 4 to the third forwarding database of the switch 1 according to the information about the third forwarding database on the switch 2. In an implementation, when entries of the third forwarding databases on the switch 1 and the switch 2 conflict, for example, an entry whose MAC address is MAC10 exists on both the switch 1 and the switch 2, a last update time of the entry on the switch 1 is t1, and a last update time of the entry on the switch 2 is t2 (t1<t2, indicating that the last update time of the entry on the switch 2 is later than that of the entry on the switch 1), when data on the switch 2 is synchronized to the switch 1, entries on the switch 1 may be directly overwritten according to t1<t2. Because MLAG member interface identifiers that are of the switch 1 and the switch 2 and that are corresponding to the switch 3 are the same (assuming that the MLAG member interface identifier is "m-interface4"), for the server 4, after the link 1201 is faulty, the server 4 may also communicate with the server 2 through the peer-link like the server 1. After the link 1201 is recovered, the chip of the switch 1 modifies the active-standby switching flag corresponding to the "m-interface4" in the first forwarding database, and the server 4 may communicate with the server 2 by using the link 1201.

It should be noted that embodiments provided in this application are merely examples. A person skilled in the art may clearly know that, for convenience and conciseness of description, in the foregoing embodiments, the embodiments emphasize different aspects, and for a part not described in detail in one embodiment, reference may be made to related descriptions in another embodiment. The embodiments of this application, claims, and features disclosed in the accompanying drawings may exist independently or in combination. This is not limited herein.

The foregoing descriptions are merely implementations of the present disclosure, but are not intended to limit the protection scope. Any variation or replacement readily figured out by a person skilled in the art shall fall within the protection scope of the present disclosure. Therefore, the protection scope of the present disclosure shall be subject to the protection scope of the claims.

What is claimed is:

1. A network device, comprising:
    a chip configured to:
        generate a forwarding database; and
        forward a received packet based on the forwarding database;
    wherein the forwarding database comprises a first forwarding database, a second forwarding database, and a third forwarding database;
    wherein the first forwarding database stores a mapping from at least one multi-chassis link aggregation group (MLAG) member interface to at least one active-standby switching flag;
    wherein the second forwarding database stores a mapping from at least one physical port to the at least one MLAG member interface; and
    wherein the third forwarding database stores a mapping from a media access control (MAC) address to a first MLAG member interface of the at least one MLAG member interface.

2. The network device according to claim 1, wherein the chip is further configured to:
    store a mapping from a source MAC address of the packet to a second MLAG member interface in the third forwarding database, wherein the second MLAG member interface comprises an MLAG member interface corresponding to a first physical port based on the second forwarding database, and wherein the first physical port received the packet.

3. The network device according to claim 1, wherein the chip is further configured to:
    based on an MLAG link being faulty, update a value of an active-standby switching flag corresponding to a third MLAG member interface in the first forwarding database to a backup flag, wherein the backup flag instructs the chip to send a packet pointing to the third MLAG member interface through a peer-link, and wherein the third MLAG member interface corresponds to a second physical port of the MLAG link based on the second forwarding database.

4. The network device according to claim 3, wherein the chip is further configured to:
    based on the MLAG link being recovered, update the value of the active-standby switching flag corresponding to the third MLAG member interface to a primary flag, wherein the primary flag instructs the chip to forward the packet based on the second forwarding database.

5. The network device according to claim 1, wherein the chip is further configured to:
    determine, based on the third forwarding database, that an MLAG member interface corresponding to a destination MAC address of the packet is the first MLAG member interface; and

forward the packet through a third physical port based on a value of an active-standby switching flag corresponding to the first MLAG member interface in the first forwarding database being a primary flag, wherein the third physical port corresponds to the first MLAG member interface in the second forwarding database.

6. The network device according to claim 5, wherein the chip is further configured to:

forward the packet through a peer-link based on the value of the active-standby switching flag corresponding to the first MLAG member interface being a backup flag.

7. The network device according to claim 1, wherein the network device is configured to synchronize the third forwarding database to another network device of a MLAG system, wherein the network device and the another network device are part of the MLAG system.

8. A multi-chassis link aggregation group (MLAG) link switching method, comprising:

updating, by a network device, a value of an active-standby switching flag corresponding to a first MLAG member interface in a first forwarding database to a backup flag based on an MLAG link of the network device is faulty, wherein the backup flag instructs the network device to send a packet pointing to the first MLAG member interface through a peer-link, wherein the first MLAG member interface corresponds to a first physical port of the MLAG link according to a second forwarding database, wherein the network device comprises the first forwarding database and the second forwarding database, wherein the first forwarding database stores a mapping from at least one MLAG member interface to at least one active-standby switching flag, and wherein the second forwarding database stores a mapping from at least one physical port to the at least one MLAG member interface.

9. The method according to claim 8, further comprising:

based on the MLAG link being recovered, updating the value of the active-standby switching flag corresponding to the first MLAG member interface to a primary flag based on the first forwarding database and the second forwarding database.

10. The method according to claim 9, wherein the primary flag instructs the network device to forward the packet based on the second forwarding database.

11. The method according to claim 9, wherein the network device further comprises a third forwarding database, and the method further comprises:

storing a mapping from a source MAC address of the packet to a second MLAG member interface in the third forwarding database, wherein the second MLAG member interface corresponding to a second physical port based on the second forwarding database, and wherein the second physical port receives the packet.

12. The method according to claim 10, further comprising:

determining, based on the third forwarding database, that an MLAG member interface corresponding to a destination MAC address of the packet is the first MLAG member interface, wherein the third forwarding database further comprises a mapping from the destination MAC address to the first MLAG member interface; and based on the value of the active-standby switching flag corresponding to the first MLAG member interface in the first forwarding database is being the primary flag, forwarding the packet using the first physical port.

13. The method according to claim 8, further comprising:

based on the value of the active-standby switching flag corresponding to the first MLAG member interface being the backup flag, forwarding the packet through the peer-link.

14. The method according to claim 11, further comprising:

synchronizing the third forwarding database to another network device, wherein the another network device and the network device form an MLAG system.

15. A network device, comprising:

a chip configured to:

generate a forwarding database; and forward a received packet based on the forwarding database;

wherein the forwarding database comprises a first forwarding database, a second forwarding database, and a third forwarding database;

wherein the first forwarding database stores a mapping from at least one multi-chassis link aggregation group (MLAG) member interface to at least one active-standby switching flag;

wherein the second forwarding database stores a mapping from at least one physical port to the at least one MLAG member interface;

wherein the third forwarding database stores a mapping from a media access control (MAC) address to a first MLAG member interface of the at least one MLAG member interface; and wherein the chip is further configured to:

based on an MLAG link being faulty, update a value of an active-standby switching flag corresponding to a third MLAG member interface in the first forwarding database to a backup flag; and based on the MLAG link being recovered, update the value of the active-standby switching flag corresponding to the third MLAG member interface to a primary flag based on the first forwarding database and the second forwarding database.

16. The network device according to claim 15, wherein the chip is further configured to:

store a mapping from a source MAC address of the packet to a second MLAG member interface in the third forwarding database, wherein the second MLAG member interface comprises an MLAG member interface corresponding to a first physical port based on the second forwarding database, and wherein the first physical port received the packet.

17. The network device according to claim 15, wherein the backup flag instructs the chip to send a packet pointing to the third MLAG member interface through a peer-link, and wherein the third MLAG member interface corresponds to a second physical port of the MLAG link based on the second forwarding database.

18. The network device according to claim 15, wherein the primary flag instructs the chip to forward the packet based on the second forwarding database.

19. The network device according to claim 15, wherein the chip is further configured to:

determine, based on the third forwarding database, that an MLAG member interface corresponding to a destination MAC address of the packet is the first MLAG member interface; and forward the packet through a third physical port based on a value of an active-standby switching flag corresponding to the first MLAG member interface in the first forwarding database being the primary flag, wherein the third physical port corresponds to the first MLAG member interface in the second forwarding database.

20. The network device according to claim 19, wherein the chip is further configured to:

forward the packet through a peer-link based on the value of the active-standby switching flag corresponding to the first MLAG member interface being a backup flag.

\* \* \* \* \*